(Model.)

C. G. ANDERSON.
CHAIN.

No. 271,186. Patented Jan. 23, 1883.

Witnesses:
Phil C. Dietrich
W. R. Keyworth

Inventor.
Chas. G. Anderson
by Ira Alexander
Attorney.

UNITED STATES PATENT OFFICE.

CHARLES G. ANDERSON, OF COLUMBUS, ASSIGNOR TO NATHAN JOSEPH, OF ZANESVILLE, AND JASON McVAY, OF COLUMBUS, OHIO.

CHAIN.

SPECIFICATION forming part of Letters Patent No. 271,186, dated January 23, 1883.

Application filed December 2, 1882. (Model.)

*To all whom it may concern:*

Be it known that I, CHARLES G. ANDERSON, of Columbus, in the county of Franklin and State of Ohio, have invented certain new and useful Improvements in Chains; and I do hereby declare that the following is a full, clear, and exact description thereof, reference being had to the accompanying drawings, and to the letters of reference marked thereon, which form part of this specification, in which—

Figure 1:
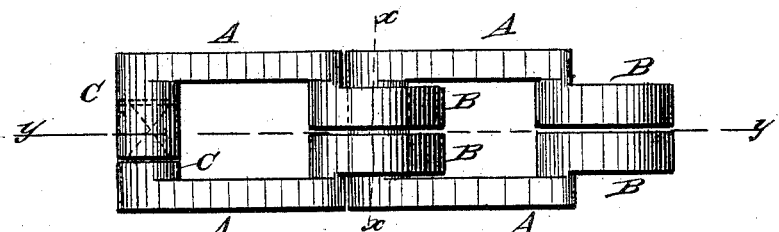
Figure 2:
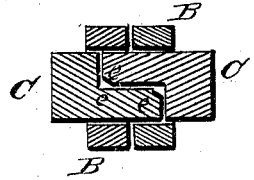
Figure 3:
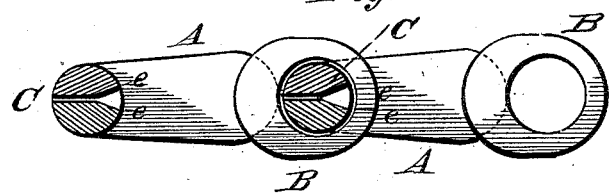
Figure 4:
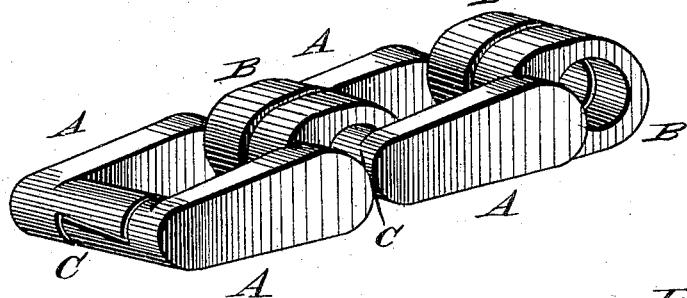

Figure 1 is a top view of two of my chain-links coupled. Fig. 2 is a transverse section taken through the links in the plane indicated by the dotted line $x\ x$ on Fig. 1. Fig. 3 is a longitudinal section taken in the plane indicated by the dotted line $y\ y$ on Fig. 1. Fig. 4 is a perspective of two of the links.

This invention relates to an improvement in the construction of chains; and my object is to so construct a chain of divisible links that the sections composing each link are detachable, all of which will be fully understood from the annexed drawings and the following description thereof.

All of the links which form a chain of any desired length are similar in construction, and for this reason a description of one link will suffice to give a clear understanding of any number of which it may be desired to employ in a chain of such links. The links are practically rectangular when coupled, although they may be made elliptical or of any other suitable shape. When taken edgewise the links may be made tapering, or their parallel bars may be made of an equal width and thickness. Each link of Figs. 1, 2, 3, and 4 is composed of two sections, A A, and each section is constructed with an eye-piece, B, and a transverse bar, C. The eye-piece B is formed on one end of the section, and the bar C is formed on the opposite end of the same section. The eye-pieces are matched, so that when the two sections composing a link are adjusted together a single eye is formed adapted to receive the interlocking bars C C of the two sections composing each link, which bars, together with the eye-pieces, constitute the pivotal connection between every pair of links.

The bars C C of every link are of equal length, and they are so beveled as to form half-dovetail connections, which will so interlock that when the coupled bars are within the said eye-pieces of an adjoining link they will be held together thereby, and lateral displacement will be effectually prevented.

It will be seen that each half-dovetailed bar C is beveled at $e$, which takes off one of the dovetailed angles and allows the coupling and uncoupling of the link-sections by adjusting them at an angle to each other, so as to bring the surface $e$ of one bar C in contact with the corresponding surface of the other bar C.

It will be seen from the above description that all of the links in my chain of sectional links are mutually dependent one on the other for their coupling, and each link or part of a link can be detached from its fellow and a new part substituted.

It will be furthermore observed that each pair of link-sections is a coupler for the adjacent sections, so that all of the links composing a chain are mutually dependent upon each for their union and pivotal or hinged connections.

Having thus fully described my invention, what I claim as new, and desire to secure by Letters Patent, is—

The combination of the longitudinal side bars, A A, the transversely-perforated eye-pieces B B, the half-dovetail interlocking portions C C, and the beveled surfaces $e\ e$ on the latter, substantially as described.

In testimony that I claim the foregoing as my own I affix my signature in presence of two witnesses.

CHARLES G. ANDERSON.

Witnesses:
WILLIAM P. BROWN,
JAS. FINLEY BROWN.